United States Patent

Amano

[15] 3,671,959

[45] June 20, 1972

[54] BINARY TO TERNARY CONVERTER

[72] Inventor: Kitsutaro Amano, Yokohama-shi, Japan

[73] Assignee: Kokusai Denshin Denwa Kebushiki Kaisha, Tokyo-to, Japan

[22] Filed: Jan. 20, 1970

[21] Appl. No.: 4,217

[30] Foreign Application Priority Data

Jan. 24, 1969 Japan....................................44/5135
March 24, 1969 Japan..................................44/21696

[52] U.S. Cl..........................340/347 DD, 178/68, 325/38 A

[51] Int. Cl...........................................................H04l 3/00

[58] Field of Search............340/347, 352; 235/154; 178/66, 178/68, 53.1; 325/38

[56] References Cited

UNITED STATES PATENTS

| | | | |
|---|---|---|---|
| 2,912,684 | 11/1959 | Steele | 340/347 |
| 3,302,193 | 1/1967 | Sipress | 340/347 |
| 3,154,777 | 10/1964 | Thomas | 340/347 |
| 3,149,323 | 9/1964 | Aaron et al. | 340/347 |
| 3,214,749 | 10/1965 | Karnaugh | 340/347 |

*Primary Examiner*—Maynard R. Wilbur
*Assistant Examiner*—Charles D. Miller
*Attorney*—Robert E. Burns and Emmanuel J. Lobato

[57] ABSTRACT

A system for converting two binary pulse trains to a ternary pulse train in which the states of signal elements of a pulse train of bipolar code corresponding to a first binary information train are modified in accordance with the states of signal elements of a second binary information train so as to be against the rule of alternation of polarities "+" and "−" of the bipolar code if at least two signal elements of the pulse train of bipolar code have the same state "1" or "0." The above-mentioned modification is performed, except for the first signal element of the same state "1" or "0," for each signal element or for each pair of adjacent two signal elements.

3 Claims, 4 Drawing Figures

BINARY TO TERNARY CONVERTER

This invention relates to a pulse signal combining system and more particularly to a signal converting system for converting two binary pulse trains to a ternary pulse train.

In a case of transmitting a pulse-code-modulated signal through a base band by the use of simple repeaters, the transmitted signal is required to meet the following conditions: (1) the necessary band-width is narrow; (2) the effect of cutting-off the dc component in the transmission line is negligible; and (3) detection of bit-timing information is easy. As examples of the format of the transmitted signal to meet with the above-mentioned requirements, there have been proposed many types of signals, such as a bi-polar code or a paired selected ternary code. In this case, the bi-polar code is so converted from an original binary code that the "0" of the binary code is converted to "0", and the "1" of the binary code is converted to "+1" or "−1" alternately. On the other hand, the paired selected ternary code is obtained from an original binary code in accordance with the following principle shown in Table 1.

TABLE 1

| (+) mode original binary code | (+) mode converted ternary code | (−) mode original binary code | (−) mode converted ternary code |
|---|---|---|---|
| 1 1 | + − | 1 1 | + − |
| 1 0 | + 0 | 1 0 | − 0 |
| 0 1 | 0 + | 0 1 | 0 − |
| 0 0 | − + | 0 0 | − + |

In this case, the (+) mode and (−) mode are alternately changed to each other at every occurrence of the signal pattern "10" or "01."

The above mentioned ternary codes have redundancy since transmissible information is binary (i.e.; "1" and "0") while the transmitted configuration of pulse signal is ternary (i.e.; "+,""0" and "−"). In other words, while one digit of the ternary code theoretically permits the transmission of information of $\log_2 3 = 1.58$ (bits), only the information of $\log_2 2 = 1$ (bit) is actually transmitted.

An object of this invention is to provide a signal converting system for obtaining, from two binary signals, a ternary signal transmissible of more information in comparison with the conventional code.

Another object of this invention is to provide a signal converting system for obtaining, from two binary signals, a ternary signal readily detectable of bit timing information.

Another object of this invention is to provide a signal converting system for obtaining, from two binary signals, a ternary signal transmissible in a transmission line in which the dc component is cut off.

In a converting system of this invention, to attain the above mentioned objects and other objects of this invention, the states of signal elements of a pulse train of bipolar code corresponding to a first binary information train are modified in accordance with the states of signal elements of a second binary information train so as to be against the rule of alternation of polarities "+" and "−" of the bipolar code if at least two signal elements of the pulse train of bipolar code have the same state "1" or "0". This modification is performed, except for the first signal element of the same state "1" or "0," for each signal element or for each pair of adjacent two signal elements.

The principle, construction and operation of the converting system of this invention will be better understood from the following more detailed discussion in conjunction with the accompanying drawings, in which FIG. 1 shows time charts explanatory of the principles of an example of this invention;

Figure 1:
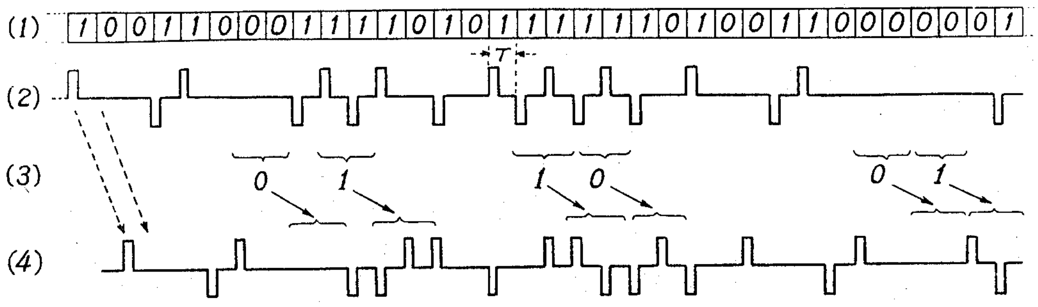

With reference to FIG. 1, the principle of an example of this invention will be described. In FIG. 1, an information train 1 is a first binary information train I to be transmitted, an information train 2 is a pulse train of bipolar code corresponding to the first binary information train, an information train 3 is a second binary information train II to be transmitted together with the first information train I, and an information train 4 is a pulse train converted in accordance with this invention.

The above mentioned pulse train 4 is obtained by the following principle. At first, the states of successive signal elements more than three having the same binary information "0" or "1" in the first binary information train I are modified in accordance with successive binary information of the second binary information train II 3 as shown in the following table 2.

TABLE 2

| Binary Inf. (I) (1) | Bipolar code (2) | Binary Inf. (II) (3) | Converted code (4) |
|---|---|---|---|
| 1 0 0 0 | + 0 0 0 | 0 | + 0 0 0 |
| 1 0 0 0 | + 0 0 0 | 1 | + 0 + − |
| 1 0 0 0 | − 0 0 0 | 0 | − 0 0 0 |
| 1 0 0 0 | − 0 0 0 | 1 | − 0 − + |
| 0 1 1 1 | 0 + − + | 0 | 0 + − + |
| 0 1 1 1 | 0 + − + | 1 | 0 + + − |
| 0 1 1 1 | 0 − + − | 0 | 0 − + − |
| 0 1 1 1 | 0 − + − | 1 | 0 − − + |

As understood from the table 2, if three signal elements of "0" appear successively in the first binary information train I (1), the second and third signal elements of these three signal elements "0" of the pulse train 2 of bipolar code are converted to plus and minus pulses +− or minus and plus pulses −+ in accordance with the polarity of a signal element immediately preceding the first signal element of the state "0," if the polarity of a signal element to be transmitted of the second binary information train II (3) assumes the state "1," the second and third signal elements of the three signal elements are not modified if the polarity of a signal element to be transmitted of the second binary information trail II (3) assumes the state "0." Moreover, the rule of alternation of polarities "+" and "−" in the bipolar code is broken by the above-mentioned modification as shown at the second and fourth lines of the rightmost column in table 2. On the other hand, if three signal elements of the state "1" appear successively in the first binary information train II (3), the second and third signal elements of these three signal elements of the pulse train 2 of bipolar code are respectively inverted so as to be against the rule of alternation of polarity "+" and "−" in the bipolar code if the state of a signal element to be transmitted of the second binary information II (3) assumes the state "1," while the second and third signal elements of the three signal elements of the pulse train 2 of bipolar code are not inverted if the polarity of a signal element to be transmitted of the second binary information train II (3) assumes the state "0."

If four signal elements of the state "0" or "1" appear successively in the first binary information train I (1), the preceding three signal elements in the pulse train 2 of bipolar code are modified in accordance with the same principle as mentioned above, while the last signal element is not modified.

If five signal elements of the same state "0" or "1" appear successively in the first binary information train I (1), two bits of binary information can be transmitted by the use of two sets of successive two signal elements of the same state which are respectively the second and third signal elements and the fourth and fifth signal elements except the first signal element. By way of example, if the states of six signal elements of the first binary information train I 1 are " 1 0 0 0 0 0 " and the states of two signal elements of the second binary information train II 3 are " 0 1 ," the states " 1 0 0 0 0 0 " of the first binary information train are modified to states "+ 0 0 0 + −" as follows: (i) the first signal element of the state "1" is converted to the state "+" of bipolar code; (ii) the second signal element of the state "0" is not modified similarly as mentioned above with reference to three or four signal elements; (iii) the next two (third and fourth) signal elements of the state "0" (i.e.; second and third "0") are not modified since the state of the second binary information train II (3) is the state "0;" and the last two (fifth and sixth) signal elements of the state "0" (i.e.; fourth and fifth "0") are converted to states "+ −" respectively by inverting polarities "− +" obtained in accordance with the rule of the alternation of polarities "+" and "−" in the bipolar code since the state of the second binary information train II 3 is the state "1." As mentioned above, if $(2n + 1)$ or $2(n + 1)$ signal elements of the same state "1" or "0" appear successively in the first binary information train I (1), $n$ bits of binary information of the second binary information train II 3 can be combined with the first binary information train I (1) in accordance with this invention. To perform the above mention-d conversion, it is necessary to count three of the signal elements of the same state "1" or 0." Accordingly, the states of signal elements of the converted output pulse train 4 are delayed, by two signal elements, from the states of the respectively corresponding signal elements of the input pulse trains I and II. However, this delay is out of the question for transmitting digital information.

In detecting the second binary information II (3) from the converted pulse train 4 at the receiving side, the rule of alternation of polarities "+" and "−" of the bipolar code in the transmitted pulse train 4 is tested. In this test, if it is detected that the rule of alternation of polarities "+" and "−" of the bipolar code is not kept within three signal elements of the state "0" or three pulses, the receiving side decides that a binary information "1" of the second binary information train II (3) is transmitted for each of this detection. On the other hand, if it is detected that the rule of alternation of polarities "+"0 and "−" of the bipolar code is kept within three signal elements of the state "0" or three pulses, the receiving side decides that a binary information "0" of the second binary information train II (3) is transmitted for each of this detection.

The converted pulse train 4 of this invention can be transmitted through a necessary band-width substantially equivalent to the necessary band width of the pulse train 2 of bipolar code and is not affected by cutting of the dc component in the transmission line similarly to the pulse train 2 of the bipolar code since the binary information "1" and "0" of the second binary information train II (3) are respectively transmitted by combinations of states "+ −" or "− +" and "0 0" of a pair of successive signal elements of the converted pulse train 4. Moreover, since the number of signal elements of the state "0" is reduced, bit timing information is readily detected at the receiving side from the transmitted pulse train.

If it is assumed that states "0" and "1" appear at random in each of the first binary information train I 1 and the second binary information train II 3, and that the probability of appearance of the state "1" in each of the first and second binary information trains I and II is a value ½, then the transmissible bits of information increase theoretically about 16 percents (%) in comparison with the conventional bipolar code.

Figure 2:
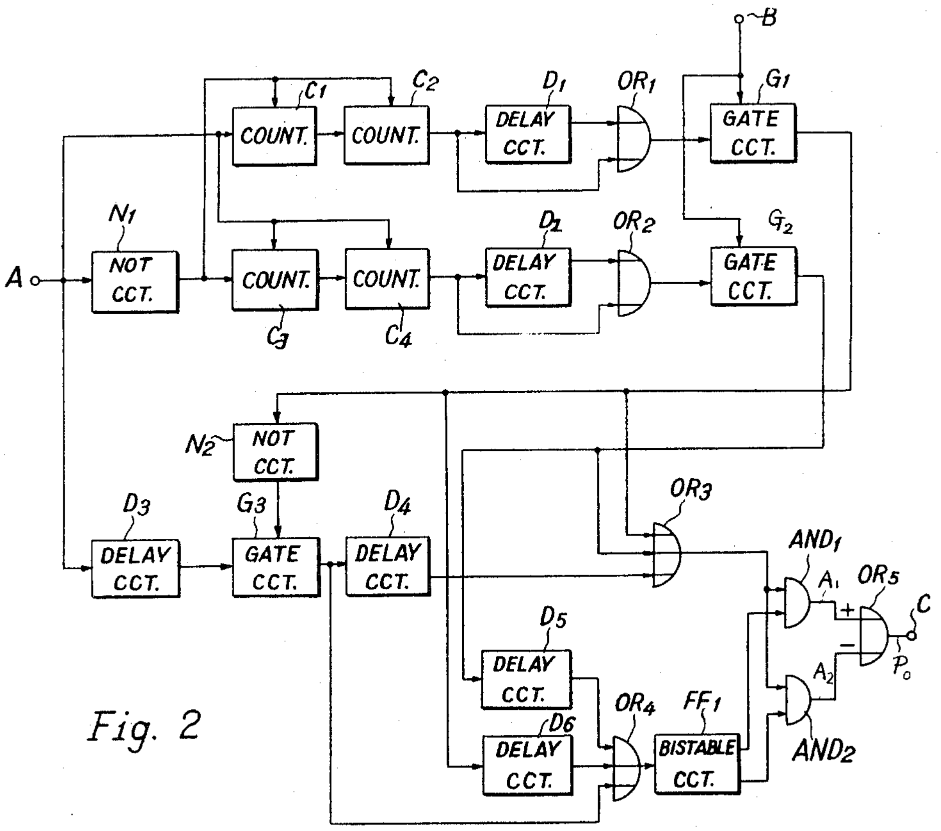
FIG. 2 is a block diagram illustrating an embodiment of this invention for performing the principle shown in FIG. 1.

With reference to FIG. 2, an example of the circuit to perform the above mentioned principle of this invention will be described. In this example, the first binary information train I is applied to an input terminal A, and the second binary information train II is applied to an input terminal B. The converted pulse train of this invention is obtained from an output terminal C as described below. Counters $C_1$ and $C_2$ each of which is a binary counter operate as a ternary counter by feeding back (not shown) from the output of the counter $C_2$ to the counter $C_1$ at the initial counting just after resetting by the output of a NOT circuit I, and also operate as a binary counter after a carry pulse is generated from the counter $C_2$; and counters $C_3$ and $C_4$ are the same as the counters $C_1$ and $C_2$. However, the counters $C_3$ and $C_4$ are reset by a pulse applied from the terminal A. Each of the delay circuits $D_1$ and $D_2$ has a delay time equal to the period T of pulses of the adjacent signal elements of the first pulse train I. A delay circuit $D_3$ is provided so that the first binary information train I applied from the terminal A is checked at a gate circuit $G_3$ when a pulse is obtained at the output of a gate circuit $G_1$. A delay circuit $D_4$ is provided so that the output pulse of the gate circuit $G_3$ is applied, through an OR circuit $OR_3$, to AND circuits $AND_1$ and $AND_2$ after the state of a bistable circuit $FF_1$ is reversed by the output pulse of the gate circuit $G_3$ through an OR circuit $OR_4$. Each of delay circuits $D_5$ and $D_6$ is provided so that the state of the bistable circuit $FF_1$ is reversed by an output of the gate circuit $G_1$ or $G_2$ through the OR circuit $OR_4$ after the output of the gate circuit $G_1$ or $G_2$ is applied to the AND circuits $AND_1$ and $AND_2$ through the OR circuit $OR_3$.

In operation, if the first binary information train I without successive three signal elements of the same state "1" or "0" is applied to the input terminal A, a pulse signal of the state "1" in this binary information train I passes through the delay circuit $D_3$, the gate circuit $G_3$ (opened because of no output of the gate circuit $G_1$ at this time) and the OR circuit $OR_4$ and reverses the state of the bistable circuit $FF_1$. Moreover, a pulse obtained from the gate circuit $G_3$ passes through the delay circuit $D_4$ and the OR circuit $OR_3$ and is applied to the AND circuits $AND_1$ and $AND_2$, so that a pulse $A_1$ or a pulse $A_2$ is obtained at the output of the AND circuits $AND_1$ or $AND_2$ in accordance with the state of the bistable circuit $FF_1$. An OR circuit $OR_5$ is so designed that the output $P_0$ assumes the state "+1" when the output $A_1$ of the AND circuit $AND_1$ assumes the state "1," the output $P_0$ assumes the state "−1" when the output $A_2$ assumes the state "1," and the output $P_0$ assumes the state "0" when both the outputs $A_1$ and $A_2$ assume the state "0." Accordingly, the output $P_0$ obtained at the output terminal C is a pulse train of bipolar code.

If more than three pulse signals of the same state "1" are successively applied to the input terminal A, the number of these pulses are counted by the counters $C_1$ and $C_2$ and an output pulse is obtained from the counter $C_2$ when three pulses are applied from the terminal A. Thereafter, the counters $C_1$ and $C_2$ generate an output pulse in response to every two pulses. A pulse obtained from the counter $C_2$ passes through the OR circuit $OR_1$ and is applied to the gate circuit $G_1$. In this case, if the state of the second binary information train II assumes the state "1," the gate circuit $G_1$ is opened so that the output pulse of the OR circuit $OR_1$ passes through the opened gate circuit $G_1$ and is applied, through the OR circuit $OR_3$, to the AND circuits $AND_1$ and $AND_2$. Accordingly, a plus or minus first output pulse is obtained at the output of the OR circuit $OR_5$ in accordance with the state of the bistable circuit $FF_1$ as understood from the fore-mentioned operation. On the other hand, the output of the gate circuit $G_1$ is also applied, through the delay circuit $D_6$ and the OR circuit $OR_4$, to the bistable circuit $FF_1$ to reverse the state of this bistable circuit $FF_1$ after generation of the first output pulse. Moreover, the state of the output of the gate circuit $G_1$ is inverted by a NOT circuit $N_2$, so that the gate circuit $G_3$ is closed to check succeeding pulses from the delay circuit $D_3$ at the same time as the generation of the first output pulse. Furthermore, the fore-mentioned output pulse of the counter $C_2$ is delayed, by the period T of pulses of the adjacent signal elements of the first binary information train I, in the delay circuit $D_1$ and passes through the OR circuit $OR_1$. Since the gate circuit $G_1$ is opened by the state "1" of the same signal element of the second binary information train II, the above mentioned delayed pulse passes through the opened gate circuit $G_1$ and applied through the OR circuit $OR_3$ to the AND circuits $AND_1$ and $AND_2$. However, the state of the bistable circuit $FF_1$ is reversed after the generation of the first output pulse, and a minus or plus second output pulse having a different polarity from the first output pulse is obtained from the OR circuit $OR_5$.

If the state of the second binary information train II is the state "0" when the output of the OR circuit $OR_1$ is applied to the gate circuit $G_1$, the gate circuit $G_1$ generates no output pulse. Accordingly, the state of the delay circuit $D_3$ passes through the opened gate $G_3$. In this case, the state of the bistable circuit $FF_1$ is reversed by each output pulse of the gate circuit $G_3$, so that the output pulses $P_o$ keeping the rule of the alternation of polarities "+" and "−" of the bipolar code are obtained at the output terminal C.

In a case where signal elements of the same state "0" more than three are successively applied to the input terminal A, pulse signals the number of which is equal to the number of signal elements of the state "0" are obtained at the output of a NOT circuit $N_1$. The number of these pulse signals is counted by the binary counters $C_3$ and $C_4$ and an output pulse is obtained from the counter $C_4$ when three pulses are obtained at the output of the NOT circuit $N_1$. Thereafter, a pulse is obtained at the output of the counter $C_4$ in response to every two pulses obtained from the NOT circuit $N_1$. The output pulses of the counter $C_4$ are applied, through an OR circuit $OR_2$ (or after delay of the time T by the delay circuit $D_2$), to the gate circuit $G_2$. If the state of the second binary information train II is the state "0," the output of the OR circuit $OR_2$ is checked by the gate circuit $G_2$. However, if the state of the second binary information train II is the state "1," the output of the OR circuit $OR_2$ passes through the gate circuit $G_2$ opened by the state "1" of the second binary information train II. Operations performed thereafter are similar to the above-mentioned operation, so that a converted pulse train is obtained at the output terminal C in accordance with the principle shown in table 2.

Figure 3:
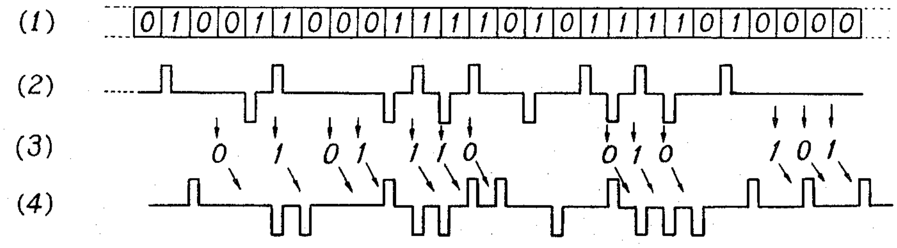
FIG. 3 shows time charts explanatory of the principle of another example of this invention.

With reference to FIG. 3, the principle of another example of this invention will be described. In FIG. 3, an information train 1 is a first binary information train I to be transmitted, an information train 2 is a pulse train of bipolar code corresponding to the first binary information train I, an information train 3 is a second binary information train II to be transmitted together with the first information train I, and an information train 4 is a pulse train converted in accordance with this invention.

The above mentioned pulse train 4 is obtained by the following principle. At first, successive signal elements more than two having the same binary information "0" or "1" in the first binary information train I are modified in accordance with successive binary information of the second binary information train II 3 as shown in the following table 3.

TABLE 3

| Binary Inf.(I) (1) | Bipolar code (2) | Binary Inf. (II) (3) | Converted code (4) |
|---|---|---|---|
| 1000 | +000 | 00 | +000 |
| 1000 | +000 | 01 | +00+ |
| 1000 | +000 | 11 | +0++ |
| 1000 | +000 | 10 | +0+0 |
| 1000 | −000 | 00 | −000 |
| 1000 | −000 | 01 | −00− |
| 1000 | −000 | 11 | −0−− |
| 1000 | −000 | 10 | −0−0 |
| 0111 | 0+−+ | 00 | 0+−+ |
| 0111 | 0+−+ | 01 | 0+−− |
| 0111 | 0+−+ | 11 | 0++− |
| 0111 | 0+−+ | 10 | 0+++ |
| 0111 | 0−+− | 00 | 0−+− |
| 0111 | 0−+− | 01 | 0−++ |
| 0111 | 0−+− | 11 | 0−−+ |
| 0111 | 0−+− | 10 | 0−−− |

As understood from the table 3, if more than two signal elements of the state "0" appear successively in the first information train I, the states of these signal elements except the first signal element of the state "0" are modified for each bit in accordance with the state of the instant signal element of the second binary information train II. In this case, if the state of the instant signal element of the second binary information signal II assumes the state "0," the state "0" of the signal element or elements of the pulse train 2 of bipolar code corresponding to the first binary information train I becomes without modification the state of the converted pulse train 4. However, if the state of the instant signal element of the second binary information signal II assumes the state "1," the state of the signal element or elements of the pulse train of bipolar code corresponding to the first binary information train I assumes the same state as that of a signal element of bipolar code immediately preceding the first signal element of the state "0."

On the other hand, if more than two signal elements of the state "1" appear successively in the first information trail I, the states of the signal elements of the pulse train 2 of bipolar code corresponding to the first binary information train I are reversed for each signal element except the first signal element of the state "1" if the state of the instant signal element of the second binary information train II assumes the state "1." However, the states of the signal elements of the pulse train 2 of bipolar code corresponding to the first binary information train I are not modified if the state of the instant signal element of the second binary information train II assumes the state "0."

As mentioned above, if *n* signal elements of the same state "1" or "0" appear successively in the first binary information train I, ($n-1$) bits of binary information of the second binary information train II can be combined with the first binary information train I in accordance with this example of this invention. To perform the abovementioned conversion, it is necessary to count two signal elements of the same state "1" or "0." Accordingly, the states of signal elements of the converted output pulse train 4 are delayed, by one signal element, from the states of the respectively corresponding signal elements of the input pulse trains I and II. However, this delay is out of the question for transmitting digital information.

In detecting the second binary information train II from the converted pulse train 4 at the receiving side, the rule of alternation of polarities "+" and "−" of the bipolar code in the transmitted pulse train 4 is tested. In this case, if it is detected that the rule of alternation of polarities "+" and "−" of the bipolar code is not kept within two signal elements of the state "0" or two pulses, the receiving side decides that a binary information "1" of the second binary information train II is transmitted for each of this detection. On the other hand, if it is detected that the rule of alternation of polarities "+" and "−" of the bipolar code is kept within two signal elements of the state "0" or two pulses, the receiving side functions so that a binary information "0" of the second binary information train II is transmitted for each such detection.

If it is assumed that states "0" and "1" appear at random in each of the first binary information train I and the second binary information train II and that the probability of appearance of the states "1" in each of the first and second binary information trains I and II is a value ½, then the transmissible bits of information increase theoretically about 50 percent (%) in comparison with the conventional bipolar code in accordance with this conversion.

Figure 4:
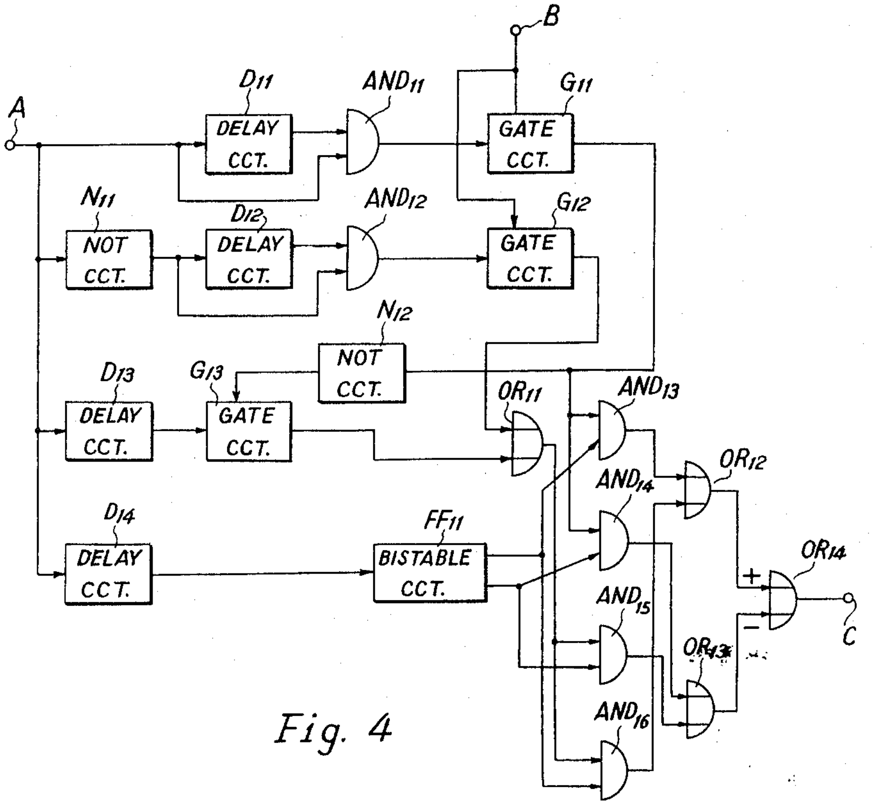
FIG. 4 is a block diagram illustrating another embodiment of this invention for performing the principle shown in FIG. 3.

With reference to FIG. 4, an example of the circuit to perform the above mentioned latter principle of this invention will be described. Terminals A, B and C are the same as those of the example shown in FIG. 2 respectively. Each of the delay circuits $D_{11}$ and $D_{12}$ are respectively the same as the delay circuits $D_1$ and $D_2$ of the example shown in FIG. 2. The delay circuit $D_{13}$ is equivalent to the delay circuit $D_3$. Moreover, an OR circuit $OR_{14}$ is the same as the OR circuit $OR_5$ described above. In this example, AND circuits $AND_{11}$ and $AND_{12}$ are provided respectively at the inputs of gate circuits $G_{11}$ and $G_{12}$, and a bistable circuit $F_{11}$ controlls four AND circuits, $AND_{13}$, $AND_{14}$, $AND_{15}$ and $AND_{16}$; the outputs of which are applied through an OR circuit $OR_{12}$ or $OR_{13}$ to the OR circuit $OR_{14}$. Other means are similar to corresponding means of the example shown in FIG. 2.

In operation of the example shown in FIG. 4, if the first binary information train I, without two successive signal elements of the same state "1" or "0," is applied to the terminal A, pulses of the state "1" in this binary information train I pass through the delay circuit $D_{14}$ and reverse the state of the bistable circuit $F_{11}$ for every pulse. Moreover, pulses of the state "1" in the first binary information train I pass through the gate circuit $G_{13}$ (opened because of no output of the gate circuit $G_{11}$ at this time) and an OR circuit $OR_{11}$ and are applied to the AND circuits $AND_{15}$ and $AND_{16}$, so that a pulse is obtained at the output of the AND circuit $AND_{15}$ or $AND_{16}$ in accordance with the state of the bistable circuit $FF_1$. The output of the AND circuit $AND_{15}$ and the output of the AND circuit $AND_{16}$ are applied, through the OR circuits OR $_{12}$ and $OR_{13}$ respectively; to the OR circuit $OR_{14}$. Accordingly, the first binary information train I is converted to a pulse train of bipolar code in this case without modification.

If pulse signals of the same state "1" more than two are successively applied to the input terminal A, pulses are obtained at the output of the AND circuit $AND_{11}$ in response to the second, third, fourth,... pulses of the signal elements of the state "1" of the first binary information train I respectively. In this case, if the state of the instant signal element of the secondary binary information train II assumes the state "0," the output of the AND circuit $AND_{11}$ is checked at the gate circuit $G_{11}$. In this case, the first binary information train I passes through the delay circuit $D_{13}$, the gate circuit $G_{13}$, and the OR circuit $OR_{11}$ and is applied to the AND circuits $AND_{15}$ and $AND_{16}$ to be converted to a pulse train of bipolar code. However, if the state of the instant signal element of the second binary information train II assumes the state "1," the gate circuit $G_{11}$ is opened so that the output of the AND circuit $AND_{11}$ passes through the gate circuit $G_{11}$. The output of the gate circuit $G_{11}$ is applied to a NOT circuit $N_{12}$ so that a succeeding signal element or elements of the first binary information train I is/are checked at the gate circuit $G_{13}$. At the same time, the output of the gate circuit $G_{11}$ is applied to the AND circuits $AND_{13}$ and $AND_{14}$. In this case, since the AND circuits $AND_{13}$ and $AND_{14}$ are controlled by different outputs of the bistable circuit $FF_{11}$ from the respective controlling outputs applied to the AND circuits $AND_{15}$ and $AND_{16}$, the states of the first binary information train I are modified to be against the rule of alternation of polarities "+" and "−" of the bipolar code by the AND circuits $AND_{13}$ and $AND_{14}$, the OR circuits $OR_{12}$ and $OR_{13}$ and the OR circuit $OR_{14}$.

In a case where more than two signal elements of the same state "0" are successively applied to the input terminal A, pulse signals the number of which is equal to the number of signal elements of the state "0" are obtained at the output of a NOT circuit $N_{11}$. Operations performed in the delay circuit $D_{12}$, the AND circuit $AND_{12}$ and the gate circuit $G_{12}$ are the same as the operations performed as the delay circuit $D_{11}$, the AND circuit $AND_{11}$ and the gate circuit $G_{11}$ respectively. The output of the gate circuit $G_{12}$ is applied through the OR circuit $OR_{11}$ to the AND circuits $AND_{15}$ and $AND_{16}$. In this case, since no pulse is applied to the bistable circuit $FF_{11}$, pulses having the same state as the state of a signal element of bipolar code immediately preceding the first signal element of the state "0" are obtained as shown in table 3 at the output terminal C.

The receiving side to detect the first binary information train I and the second binary information train II from the transmitted pulse train can be designed in consideration of the principle of the above-mentioned conversion of this invention.

What I claim is:

1. A system for converting two binary information signal trains to a ternary pulse train, comprising:
- conversion means having an input for application of a first binary information train for converting said first binary information train to a pulse train of bipolar code,
- detection means having an input coupled to said conversion means input for detecting the occurrence of groups of three or more successive signal elements of the same state from the first binary information train, and
- control means coupled to said conversion means and said detection means and having an input terminal for application of a second binary information train, wherein said control means is for modifying the states of signal elements of the pulse train of bipolar code in accordance with the states of the signal elements of the second binary information train so as to oppose the rule of alternation of polarities "+" and "−" of the bipolar code in response to said detection of the detection means.

2. A system for converting two binary information signal trains to a ternary pulse train, comprising:
- a first input terminal for receiving a first binary information train,
- a second input terminal for receiving a second binary information train,
- an output terminal for sending out the ternary pulse train,
- first signal generating means connected to the first input terminal to generate an output pulse in response to three successive signal elements of the same state "1" after a signal element of the state "0" in the first binary information train and to generate an output pulse in response to each pair of successive two signal elements of the same state "1" after said three signal elements in the first binary information train,
- second signal generating means connected to the first input terminal to generate an output pulse in response to three successive signal elements of the state "0" after a signal element of the state "1" in the first binary information train and to generate an output pulse in response to each pair of successive two signal elements of the same state "0" after said three signal elements of the state "0" in the first binary information train,
- first gate means coupled to the second input terminal and to the first generating means for conducting therethrough the output pulses of the first generating means only when the state of the second binary information train assumes the state "1,"
- second gate means coupled to the second input terminal and to the second generating means for conducting therethrough the output pulses of the second generating means only when the state of the second binary information train assumes the state "1,"
- third gate means coupled to the first input terminal and to the first gate means for conducting therethrough the first binary information train only when the first gate means generates no output,
- a bistable circuit coupled to the outputs of the first, second and third gate means for reversing its stable state in response to each of the output pulses of the first, second and third gate means, and
- control means having inputs coupled to the bistable circuit and to the first, second and third gate means, and having an output coupled to the output terminal, for converting the first binary information train received from the third gate means to a pulse train of bipolar code and for converting the outputs of the first and second gate means in accordance with the state of the bistable circuit so as to oppose the rule of alternation of polarities "+" and "−" of the bipolar code.

3. A system for converting two binary information signal trains to a ternary pulse train, comprising:
- a first input terminal for receiving a first binary information train,
- a second input terminal for receiving a second binary information train,
- an output terminal for sending out the ternary pulse train,
- first signal generating means connected to the first input terminal to generate an output pulse in response to each of successive signal elements of the same state "1" of the first binary information train, except for the first of said successive signal elements,
- second signal generating means connected to the first input terminal to generate an output pulse in response to each of successive signal elements of the same state "0" of the first binary information train, except for the first of said successive "0" signal elements, first gate means coupled to the second input terminal and to the first generating means for conducting therethrough the output pulses of the first generating means only when the state of the second binary information train assumes the state "1,"

second gate means coupled to the second input terminal and to the second generating means for conducting therethrough the output pulses of the second generating means only when the state of the second binary information train assumes the state "1,"

third gate means coupled to the first input terminal and to the first gate means for conducting therethrough the first binary information train only when the first gate means generates no output, a bistable circuit coupled to the input terminal for reversing its stable state in response to each signal element of the state "1" of the first binary information train, and control means having inputs coupled to the bistable circuit and to the first, second and third gate means, and having an output coupled to the output terminal for converting the first binary information train received from the third gate means to a pulse train of bipolar code and for converting the outputs of the first and second gate means in accordance with the state of the bistable circuit so as to oppose the rule of alternation of polarities "+" and "−" of the bipolar code.

* * * * *